Patented Oct. 24, 1933

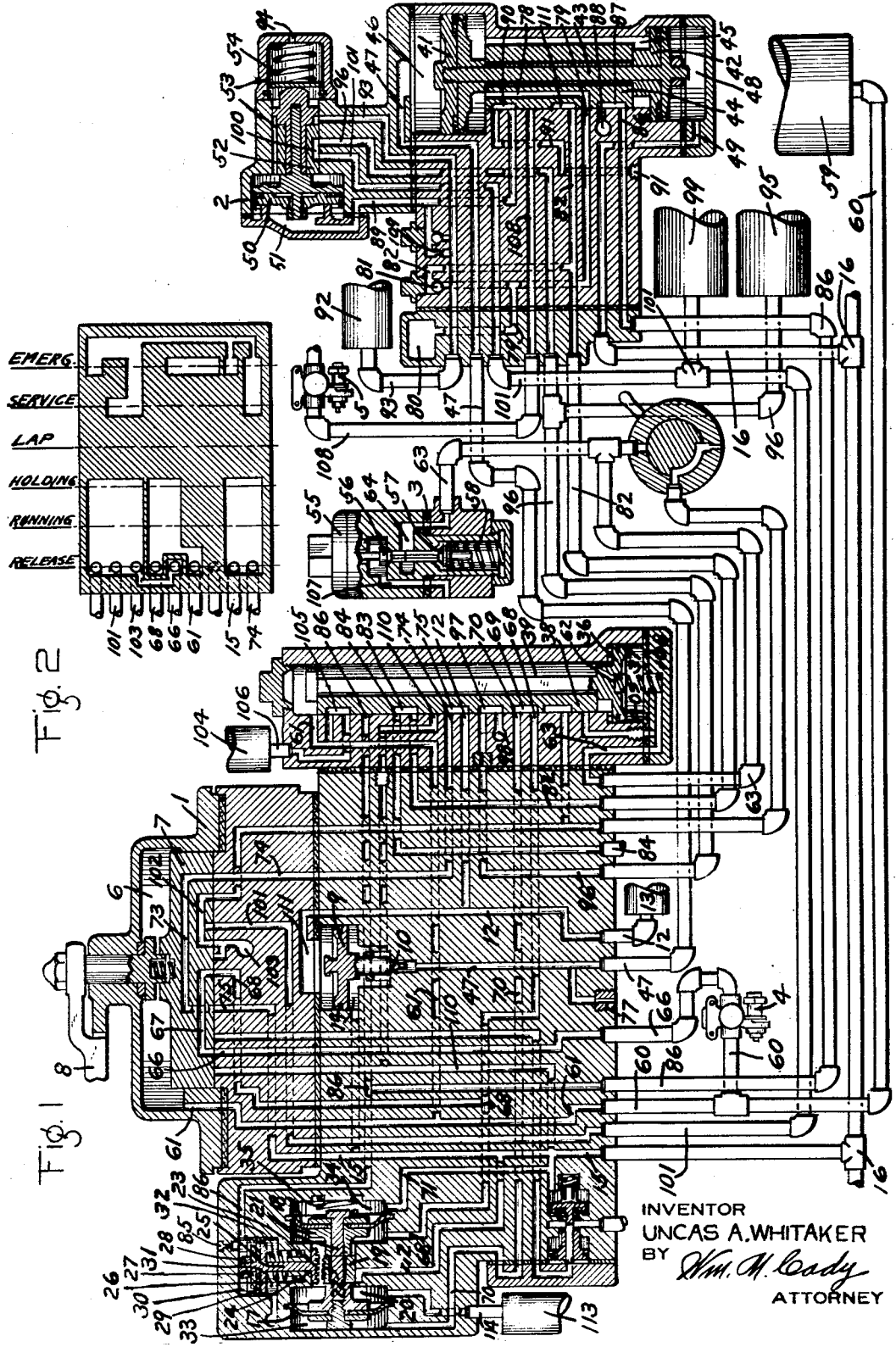

1,932,058

UNITED STATES PATENT OFFICE 1,932,058

BRAKE PIPE LEAKAGE COMPENSATOR

Uncas A. Whitaker, Canton, Ohio, assignor to The Westinghouse Air Brake Company, Wilmerding, Pa., a corporation of Pennsylvania Application December 27, 1929
Serial No. 416,823

13 Claims. (Cl. 303—18)

This invention relates to fluid pressure brakes, and more particularly to an automatic train control apparatus in which the brakes are applied by reducing the brake pipe pressure in successive stages.

Various means have heretofore been disclosed for applying the brakes on a train by reducing the brake pipe pressure in successive stages, such means, for example, being shown in Patent No. 1,663,736, granted March 27, 1928, to Thomas H. Thomas and Earle S. Cook.

According to the above mentioned patent, an initial light reduction is effected in brake pipe pressure to lightly apply the brakes, and then after a time, sufficient to bunch the slack in the train, a second and heavier reduction is effected in brake pipe pressure to produce the desired application of the brakes.

According to the above mentioned patent, the time from the start of the first to the start of the second reduction in brake pipe pressure is governed by the time the equalizing piston in the brake valve device holds the brake pipe discharge valve open in effecting the initial reduction. Leakage from the brake pipe aids the brake pipe discharge valve in reducing the brake pipe pressure, and under such a condition, the discharge valve will close sooner than if the brake pipe is leak proof, with the result that the second stage of reduction will be started sooner than it should be and cause severe running in of the slack, which might result in damage to the train.

One object of my invention is to provide means for ensuring the proper, and a substantially constant, elapse of time between the first stage and the second stage in a brake pipe reduction, irrespective of the degree of brake pipe leakage, for a train of a certain length.

Another and more specific object of my invention is to provide means, operative during the initial stage of a two-stage reduction in brake pipe pressure, to automatically compensate for leakage from the brake pipe, so as to provide a substantially constant time interval between the first and second stages of a two-stage reduction in brake pipe pressure on a train of certain length, irrespective of the degree of brake pipe leakage on said train.

Other objects and advantages will appear in the following more detailed description of my invention.

In the accompanying drawing; Fig. 1 is a diagrammatic view, partly in section, of an automatic train control equipment embodying my invention; and Fig. 2 is a diagrammatic development view of the rotary valve and seat of the brake valve device shown in Fig. 1.

As shown in the drawing, the automatic train control equipment comprises a brake valve device 1, a split reduction valve device 2, a magnet valve device 3, and two feed valve devices 4 and 5.

The brake valve device 1 comprises a casing having a valve chamber 6 containing a rotary slide valve 7 adapted to be operated by a handle 8 and said casing also contains the usual equalizing discharge valve mechanism comprising a piston 9 and a brake pipe discharge valve 10 adapted to be operated by said piston. A chamber 11 at one side of the piston 9 is connected through a passage and pipe 12 to the usual equalizing reservoir 13 and a chamber 14 at the other side of said piston is connected through passage 15 to the usual brake pipe 16.

Preferably associated with the brake valve device is a brake pipe charging control valve device comprising two spaced diaphragms 17 and 18, having their outer edges secured in the casing, and a slide valve 19 contained in a chamber 20 intermediate said diaphragms, which chamber is open to a reservoir 113 through passage and pipe 114. The slide valve 19 is interposed between two shoulders formed by the members 21 which connect said diaphragms together, and is thereby adapted to be operated by said diaphragms. Said slide valve is provided on the upper edge with serrations or saw-like teeth 22, which under certain conditions are adapted to be engaged by corresponding saw teeth 23 on a plunger member 24.

The plunger member 24 is provided with a stem 25 operatively mounted in a suitable bore in the casing and having formed at one end a flange 26. Secured between said flange and a follower 27, by means of a nut 28 having screw-threaded engagement on the stem, is a piston 29, preferably in the form of a flexible cupped packing slidably mounted in a bore in the casing. The piston 29 has at one side a chamber 30 and at the opposite side a chamber 31, a spring 32 being contained in chamber 31 and acting on flange 26 to urge the piston to the position shown in the drawing.

The diaphragm 17 has at its outer face a chamber 33, and diaphragm 18 has at its outer face a chamber 34, a spring 35 being contained in chamber 34 to urge the diaphragms and slide valve 19 to the left.

Preferably associated with the brake valve device is an application valve device comprising a piston 36 having at one side a chamber 37, and a slide valve 38 contained in a chamber 39 and adapted to be operated by said piston. A spring 40 in chamber 37 is provided to normally maintain said piston and slide valve in the position shown in the drawing.

The split reduction valve device 2 is of substantially the same construction as disclosed in the hereinbefore mentioned patent and comprises a control portion and a hold-back portion.

The control portion of the split reduction valve device comprises a casing containing differential pistons 41 and 42, said pistons being connected by a stem 43 and being adapted to operate a slide valve 44 contained in a valve chamber 45 formed intermediate said pistons. The piston 41 has at one side a chamber 46 connected to the seat of the brake pipe discharge valve 10 through passage and pipe 47, and the piston 42 has a chamber 48 at the opposite side, which chamber is in constant communication with the brake pipe 16 through a passage 49.

The hold-back portion of the split reduction valve device comprises a casing containing a piston 50 having at one side a chamber 51, and a slide valve 52 contained in a chamber 53 and adapted to be operated by said piston. A spring 54 is provided in chamber 53 to urge piston 50 and slide valve 52 to their normal position, as shown in the drawing.

The magnet valve device 3 comprises a magnet 55 and double beat valves 56 and 57 adapted to be controlled by said magnet. The magnet is adapted to be controlled according to traffic conditions, and when favorable, the magnet is energized. When the traffic conditions are unfavorable, the magnet is deenergized.

In operation, when the traffic conditions are favorable, the energization of magnet 55 operates to seat valve 56 against the pressure of a spring 58.

Fluid under pressure is supplied from a main reservoir 59 through pipe 60 to the feed valve device 4 and from said pipe through passage 61 in the brake valve device to the rotary valve chamber 6 and to the application slide valve chamber 39. From said valve chamber, fluid under pressure flows through a port 62 in the application piston 36 to chamber 37 and from thence through passage and pipe 63 to a chamber 64 in the magnet valve device 3. The valve 56 being seated, however, the pressure of fluid in chamber 64 and application piston chamber 37 builds up equal to the pressure of fluid in the application valve chamber 39. With the fluid pressures on the opposite sides of the application piston 36 thus balanced, the spring 40 maintains the piston 36 and slide valve 38 in their normal release position, as shown in the drawing.

The feed valve device 4 is adapted to reduce the pressure of fluid supplied from the main reservoir 59 through pipe 60, and supply fluid at the reduced pressure to pipe and passage 66 connected to the seat of the rotary valve 7.

With the brake valve device in the usual running position, fluid at the reduced pressure supplied by the feed valve device 4 is permitted to flow through port 67 in the rotary valve 7 to passage 68, which is connected to slide valve chamber 20 of the brake pipe charging control valve device, and to the seat of the application slide valve 38.

With the application slide valve in release position, fluid at feed valve pressure is permitted to flow from passage 68 through cavity 69 in said slide valve to passage 70 and from thence to diaphragm chamber 33. The fluid pressures in diaphragm chamber 33 and valve chamber 20 are thus balanced. Diaphragm chamber 34 is connected through passages 71 and 15 to brake pipe 16 which is initially at atmospheric pressure. Thus, the pressure of fluid in valve chamber 20 is permitted to deflect diaphragm 18 to the right, which compresses spring 35 and pulls slide valve 19 to a brake pipe charging position.

In charging position of slide valve 19, a passage 72 is uncovered in the seat, and fluid under pressure supplied by feed valve device 4 to valve chamber 20, in the manner hereinbefore described, is permitted to flow through the passage 72 and passage 15 to the brake pipe 16, thereby charging said brake pipe.

Fluid under pressure also flows from passage 72 through passage 15 to chamber 14 at the lower side of the equalizing discharge valve piston 9, and from passage 15 through a port 73 in the rotary valve 7 to a passage 74, and from thence through a cavity 75 in the application slide valve and passage 12 to piston chamber 11 and equalizing reservoir 13, thereby charging the chambers 14 and 11 and said reservoir with fluid at brake pipe pressure. The fluid pressures being equal on the opposite sides of the piston 9, said piston is operated to normally maintain the brake pipe discharge valve 10 seated, in the usual manner.

The diaphragm chamber 34, being connected to brake pipe 16 through passages 71 and 15, is also charged with fluid under pressure at the same time as the brake pipe is charged. When the pressure of fluid in diaphragm chamber 34 plus the pressure of spring 35 becomes slightly greater than the opposing pressure of fluid in diaphragm chamber 33, the diaphragm is operated to shift the slide valve 19 to the left and lap brake pipe supply passage 72, so as to prevent further flow of fluid under pressure through said passage to the brake pipe. Assuming the brake pipe 16 to be free from leakage, the fluid under pressure remains bottled up therein until intentionally vented, and until such venting occurs, the slide valve 19 remains in the lapped position, just described.

It will be noted that in order to shift the slide valve 19 to lap position, the pressure of fluid supplied by the feed valve device 4 to diaphragm chamber 33 is overcome by the slightly higher combined pressures of spring 35 and fluid at brake pipe pressure in chamber 34. It is obvious, therefore, that the fluid pressure in chamber 34 is less than the fluid pressure in chamber 33 by an amount slightly less than the pressure of spring 35, and further that the feed valve device 4 is adjusted at a higher pressure than that carried in the brake pipe 16, for reasons to be fully described hereinafter.

With the brake pipe discharge valve 10 seated, the control piston chamber 46 of the split reduction valve device is connected to the atmosphere through passage and pipe 47 and choke plug 77 in the brake valve device. The control piston chamber 48 being charged with fluid under pressure from brake pipe 16 through passage 49, the pressure of fluid acting on piston 42 maintains pistons 42 and 41, and slide valve 44, in the normal position shown in the drawing.

In the normal position of the control slide valve 44, the valve chamber 45 is open to the atmosphere through port 78 in said slide valve, passage 79, which also connects with a lock-up reservoir 80, past check valve 81, through passage and pipe 82, cavity 83 in the application slide valve 38 and from thence through atmospheric passage 84. The locking piston chamber 30 of the brake pipe charging valve device is also normally at atmospheric pressure due to the connection through a restricted atmospheric port 85, as well as through passage and pipe 86, cavity 87 in the control slide valve 44 and atmospheric passage 88. With the locking piston chamber thus at atmospheric pressure, the pressure of spring 32 maintains said piston in the position shown in the drawing, in which position saw teeth 23 on plunger 24 are held out of engagement with saw teeth 22 on slide valve 19.

In the normal position of the control slide valve, the hold back piston chamber 51 is open to the atmosphere through passage 89, cavity 90 in the control slide valve 44 and atmospheric passage 91, which permits spring 54 to maintain the piston 50 and slide valve 52 in the position shown in the drawing, in which a timing reservoir 92 is connected to the atmosphere through pipe and passage 93, valve chamber 53 and atmospheric port 94.

A first reduction reservoir 95 is normally open to the atmosphere through pipe and passage 96, cavity 97 in the application slide valve 38 and atmospheric passage 98 and is connected to a second reduction reservoir 99 through pipe and passage 96, cavity 100 in the hold-back slide valve 52, and passage and pipe 101. The second reduction reservoir 99 is also open to the atmosphere through pipe and passage 101, cavity 102 in the rotary valve 7 of the brake valve device, and an atmospheric passage 103.

A timing reservoir 104 is charged with fluid at main reservoir pressure, when the application slide valve 38 is in release position, by way of passage 61, cavity 105 in the application slide valve and passage and pipe 106.

When the traffic conditions become unfavorable, the magnet 55 is deenergized. Spring 58 then unseats valve 56, which permits fluid under pressure to be vented from the application piston chamber 37 to the atmosphere through passage and pipe 63, chamber 64 in the magnet valve device 3, past unseated valve 56 and through atmospheric passage 107. Upon venting of the fluid under pressure from piston chamber 37, the application piston 36 and slide valve 38 are shifted to application position by the pressure of fluid in valve chamber 39, in which position said piston engages a gasket 108.

In application position of the application slide valve, the equalizing piston chamber 11 and equalizing reservoir 13 are connected to the first reduction reservoir 95 through passage 12, cavity 75 in the application slide valve and passage and pipe 96. Fluid under pressure is thus permitted to flow from said piston chamber and reservoir and reduce the pressure in chamber 11 acting on the piston 9. Fluid at brake pipe pressure acting in piston chamber 14 then shifts the piston 9 upwardly, which unseats the brake pipe discharge valve 10.

With the brake pipe discharge valve unseated, fluid under pressure is permitted to flow from the brake pipe 16 through passage 15 to passage 47, through which it flows to a choke plug 77 and to control piston chamber 46 of the split reduction valve device. The choke plug 77 restricts the flow from passage 47 to the atmosphere, so as to ensure a build up of pressure in piston chamber 46, but the restricted flow to the atmosphere reduces the pressure of fluid in the brake pipe and causes an application of the brakes to be effected in the usual well known manner.

The fluid under pressure supplied through passage 47 to the control piston chamber 46 acts on piston 41 and since said piston is of larger area than piston 42, which is subject directly to brake pipe pressure, the piston 41 operates to shift the piston 42 and slide valve 44 downwardly to first reduction position.

In first reduction position of the control slide valve 44, the hold-back piston chamber 51 is connected through passage 89, cavity 90 in the control slide valve and a passage and pipe 108 to the feed valve device 5, which is adapted to reduce the pressure of fluid supplied from any suitable source and supply fluid at such reduced pressure to pipe 108 from whence it is permitted to flow to the hold-back piston chamber 51. The pressure of fluid thus supplied to piston chamber 51 shifts the hold-back piston 50 and slide valve 52 to first reduction position, in which passage 96 from the first reduction reservoir 95 is disconnected from passage 101 from the second reduction reservoir 99.

With the two reduction reservoirs disconnected from each other, the pressure of fluid in the equalizing reservoir 13 is permitted to equalize into the first reduction reservoir only, thereby limiting the degree of reduction in the equalizing piston chamber 11 to a predetermined amount, which, as a result, limits the degree of brake pipe reduction to a corresponding amount, as will be more fully explained hereinafter.

With the hold-back slide valve 52 in the first reduction position, passage 93 is lapped and fluid at the pressure supplied to the hold-back piston chamber 51 through passage 89 is also permitted to flow from said passage through a restricted port 109 to passage 93 and timing reservoir 92, which is thereby permitted to charge with fluid under pressure at a predetermined rate.

In application position of the application slide valve 38 and first reduction position of the control slide valve 44, fluid under pressure is permitted to flow from brake pipe 16 through passages 15 and 110 in the brake valve device, cavity 83 in slide valve 38, passage and pipe 82, cavity 111 in the control slide valve and passage 79 to the lock-up reservoir 80, and thereby charge said reservoir.

As hereinbefore described, the pressure in equalizing piston chamber 11 is reduced a predetermined amount by equilization of the pressures in the equalizing reservoir 13 and first reduction reservoir 95. When the brake pipe pressure in piston chamber 14 is reduced, by flow to the atmosphere through the exhaust choke plug 77, to a degree slightly less than the reduced pressure in piston chamber 11, the equalizing piston is operated to seat the brake pipe discharge valve 10, so as to prevent further discharge of fluid under pressure from the brake pipe.

After the brake pipe discharge valve seats, fluid under pressure flows from the control piston chamber 46 to the atmosphere and permits brake pipe pressure in control piston chamber 48 to shift the control pistons 42 and 41 and slide valve 44 upwardly to their normal position, as shown in the drawing.

In the normal position of the control slide valve, fluid under pressure is permitted to flow from the hold-back piston chamber 51 and the timing reservoir 92 through passage 89, cavity 90 in the control slide valve and to the atmosphere through passage 91. When the pressure in chamber 51 is thus reduced to a predetermined degree, spring 54 shifts piston 50 and slide valve 52 to their normal position as shown in the drawing, in which position the first reduction reservoir 95 is connected to the second reduction reservoir 99 through pipe and passage 96, cavity 100 in slide valve 52, and passage and pipe 101. Fluid under pressure is thereby permitted to flow from the first reduction reservoir 95 and equalizing reservoir 13 to the second reduction reservoir 99 and effect a second reduction in pressure in equalizing piston chamber 11. The equalizing piston 9 is then operated in the same manner as hereinbefore described to effect a corresponding second reduction in brake pipe pressure.

It will here be noted that the time elapse from the start of the first reduction to the start of the second reduction is governed by the interval of time the brake pipe discharge valve 10 is unseated, during which time the timing reservoir 92 is being charged, plus the time for the pressure of fluid in said reservoir to be reduced after the first reduction is completed.

When the control slide valve 44 is moved to its normal position, after the first reduction in brake pipe pressure is completed, fluid under pressure is permitted to flow from the lock-up reservoir 80 through passage 79 and port 78 to the control valve chamber 45, wherein it is bottled up and acts on piston 41 to prevent the pressure of fluid supplied to piston chamber 46 during the second reduction in brake pipe pressure from shifting the control pistons 41 and 42 and slide valve 44 to first reduction position again, which would prevent the second reduction from being effected.

When the application slide valve 38 is moved to application position upon initiating the first reduction, fluid under pressure is permitted to flow from the reservoir 104 through pipe and passage 106, cavity 105 in slide valve 38, and passage 86 to locking piston chamber 30, from whence it is gradually permitted to flow to the atmosphere through a restricted port 85. The pressure of fluid thus acting on the locking piston 29 shifts the plunger 24 downwardly, causing teeth 23 to engage teeth 22 on slide valve 19, and lock said slide valve in the position it was in prior to deenergization of the magnet 55. In the operation hereinbefore described, it was assumed that the brake pipe 16 was leak proof and that after the brake pipe was charged with fluid under pressure, the slide valve 19 was shifted to lap the passage 72, so, as a result, in the case of a leak proof brake pipe, said slide valve is locked in lap position during the first reduction.

The locking piston chamber 30 is connected to the control slide valve 44 through passage and pipe 86, which is lapped by said slide valve in first reduction position, but upon return of said slide valve to normal position at the start of the second reduction, said passage is opened to the atmosphere through cavity 87 and atmospheric passage 88. This permits fluid under pressure to be vented from the locking piston chamber 30 and reservoir 104 at the start of the second reduction.

Venting of the fluid under pressure from locking piston chamber 30 permits spring 32 to operate said piston and plunger 24 so as to disengage teeth 23 from teeth 22 on slide valve 19. The diaphragm chamber 33 being open to the atmosphere, the fluid at brake pipe pressure in diaphragm chamber 34 is then permitted to maintain said slide valve in lap position.

Locking the brake pipe charging slide valve 19 in lap position during the first reduction in brake pipe pressure and then permitting said slide valve to be maintained in lap position by the pressure of fluid in diaphragm chamber 34 acting on diaphragm 18 during the second reduction, does not have any effect upon the operation of the apparatus in the case of a leak-proof brake pipe such as was assumed to be the condition of brake pipe 16 in the preceding description of operation. However, if there is leakage from the brake pipe to the atmosphere, the brake pipe charging valve device operates in a manner different from that hereinbefore described, to render the brake pipe leakage ineffective during the first reduction in brake pipe pressure as will now be explained.

Assuming that there is leakage from the brake pipe 16, such leakage tends to reduce the pressure of fluid in the brake pipe and in diaphragm chamber 34 of the brake pipe charging valve device, which chamber is connected to the brake pipe through passages 71 and 15. With the brake equipment in the released condition, as hereinbefore described, the pressure of fluid in diaphragm chamber 33 is governed by the adjustment of the feed valve device 4 and therefore is substantially constant.

Leakage from the brake pipe to the atmosphere, reducing the pressure in diaghram chamber 34, permits the pressure in diaphragm chamber 33 to deflect the diaphragms 17 and 18 and shift slide valve 19, so as to partially uncover passage 72. This permits fluid under pressure to flow to the brake pipe and diaphragm chamber 34 and tends to maintain the pressure therein against the leakage. The construction of the brake pipe charging valve device is such, however, that the degree of opening through passage 72, as governed by the slide valve, permits an amount of fluid under pressure to flow to the brake pipe substantially equal to the amount lost therefrom by leakage, and in such a position of the slide valve 19, the opposing pressures acting on the diaphragms 17 and 18 are balanced, thereby placing the brake pipe charging valve device in a state of equilibrium.

It is thus evident that if the degree of brake pipe leakage is small, passage 72 is uncovered by slide valve 19 only a slight amount, whereas if the leakage is great, passage 72 will be uncovered a greater amount in order to permit a greater quantity of fluid under pressure to flow to the brake pipe 16, or in other words, the degree of opening through passage 72, as governed by slide valve 19, will be varied in accordance with the degree of brake pipe leakage.

When an automatic application of the brakes is initiated and fluid under pressure is supplied from reservoir 104 to the locking piston chamber 30, the locking piston 29 operates plunger 24 to engage teeth 23 with teeth 22 on slide valve 19, in the manner hereinbefore described. The slide valve 19 is thus locked in the charging position it occupied when the brakes were released, and is thus permitted to continue supplying fluid under pressure to the brake pipe 16 to compensate for the leakage therefrom.

At the same time as the brake pipe charging valve device is locked in its charging position, the first reduction is initiated by reducing the pressure of fluid in the equalizing piston chamber 11. The equalizing piston 9 then operates to unseat the brake pipe discharge valve 10 in order to reduce the brake pipe pressure and apply the brakes, and to cause the split reduction valve device to operate in the manner hereinbefore described.

Since the brake pipe charging valve device is locked in its charging position and supplies fluid under pressure to the brake pipe at the same rate as leakage from the brake pipe tends to reduce the brake pipe pressure, such leakage is ineffective in aiding the brake pipe discharge valve in effecting a brake pipe reduction. Thus the amount of fluid under pressure that has to be vented from the brake pipe by the discharge valve 10 is substantially the same as if the brake pipe were leak-proof and therefore requires the same degree of time.

When the first reduction is completed and the control slide valve 44 of the split reduction valve device is shifted back to its normal position, as shown in the drawing, in order to initiate the second reduction, fluid under pressure is vented from the locking piston chamber 30 through passage and pipe 86, cavity 87 in the control slide valve 38 and atmospheric passage 88. Spring 32 then shifts teeth 23 on plunger 24 out of engagement with teeth 22 on slide valve 19. Since the diaphragm chamber 33 is opened to the atmosphere through the application slide valve 38, the fluid at brake pipe pressure in diaphragm chamber 34 then shifts the slide valve 19 to lap position, in which passage 72 is lapped and the supply of fluid under pressure to the brake pipe is cut off. Leakage from the brake pipe is therefore permitted to aid in effecting the second stage of reduction in brake pipe pressure.

It will be noted that the brake pipe charging valve device functions to counteract the leakage from the brake pipe only during the initial reduction and at the start of the second reduction operates to completely cut off the fluid pressure supply to the brake pipe. This operation ensures a gathering of the slack in a train with brake pipe leakage with no greater intensity or shocks in the train than if there were no leakage, and after the slack is thus gathered, the rate of brake pipe reduction is not so critical and is increased according to the degree of brake pipe leakage.

It is obvious from the above description of operation, that substantially the same interval of time will elapse in effecting the first reduction in brake pipe pressure on a train of a certain length, irrespective of the degree of brake pipe leakage, since the brake pipe charging valve device will automatically operate to supply fluid under pressure to the brake pipe during the initial reduction to offset such leakage. In addition, however, the time between reductions will vary in proportion to the train length, since the time required to permit a certain reduction in brake pipe pressure depends upon the volume of brake pipe as determined by the length of a train. The brake pipe charging valve device will, however, operate to compensate for brake pipe leakage irrespective of train length.

It has heretofore been mentioned that the feed valve device 4 is adjusted to supply fluid at a pressure in excess of that carried in the brake pipe. This is essential in order to permit a substantially constant amount of fluid under pressure to be supplied to the brake pipe during the first reduction, as will now be more fully explained.

Assuming the brake pipe to be subject to a certain degree of leakage, fluid under pressure of an amount sufficient to offset said leakage is permitted to flow past valve 19 and through passage 72 to the brake pipe 16. If the feed valve device 4 is adjusted to supply fluid at 70 pounds pressure, and the pressure desired in the brake pipe is 70 pounds, there will be only a slight difference in pressure in chamber 20, containing valve 19, and in the brake pipe, such difference being caused by the leakage. Now assume a first reduction in brake pipe pressure, of say 8 pounds, is effected. The difference in pressure in valve chamber 20 and the brake pipe is increased substantially eight times, or 800%, and a correspondingly greater amount of fluid under pressure is supplied to the brake pipe at the end of the reduction, and a proportionately greater amount during the reduction, than was being supplied at the time the reduction was started. This is obviously undesirable in that it increases the amount of fluid under pressure to be vented from the brake pipe in effecting the first reduction and further increases the time required to effect the first reduction. To prevent this undesirable result, a pressure is maintained in chamber 20 in excess of the brake pipe pressure carried, of for instance 10 pounds. Thus a 10 pound differential is provided to normally maintain the brake pipe charged against leakage, while at the end of the first reduction of say 8 pounds, the differential is increased to 18 pounds, or increased 80%, or only one tenth the increase effected if the feed valve 4 were adjusted to supply fluid at the pressure carried in the brake pipe. Thus the increase in rate of flow at the end of the first reduction is only slightly greater than at the start of said reduction, and for all practical purposes may be considered substantially the same. It is, however, obvious that as the adjustment of the feed valve device 4 is increased, the rate of flow to the brake pipe at the start and at the end of the brake pipe reduction will become more nearly the same.

In order to offset this increase in feed valve adjustment over brake pipe pressure carried, the spring 35 is provided and is adapted to exert a pressure on the diaphragm 18 substantially equal to the difference between feed valve adjustment and brake pipe pressure carried.

After an automatic application of the brakes has been effected, as hereinbefore described, if the magnet 55 is again energized, the valve 56 will be seated and fluid pressure will be built up in piston chamber 37 of the application valve device by flow from valve chamber 39 through the port 62 in piston 36, and the fluid pressures on the opposite sides of piston 36 thus being permitted to equalize, the spring 40 will shift said piston and the slide valve 38 back to normal release position.

If at any time when the train control apparatus is in release position, the operator desires to effect an application of the brakes by operation of the brake valve device, he operates handle 8 to turn rotary valve 7 to service position.

In service position of the rotary valve 7, feed valve passage 66 is disconnected from passage 68 and both passages are lapped, thereby cutting off the flow of fluid under pressure from the feed valve device 4 to the brake pipe charging valve slide valve chamber 20, which renders the brake pipe charging valve device inoperative to supply fluid under pressure to the brake pipe. At the same time as the supply of fluid under pressure is cut off to the brake pipe, the equalizing reservoir 13 and equalizing piston chamber 11 are opened to the atmosphere through passage 12, cavity 75 in the application slide valve 38, passage 74 and atmospheric passage 103, thereby permitting the pressure of fluid in chamber 11 to reduce. The equalizing piston 9 then operates the brake pipe discharge valve 10 to effect a reduction in the pressure in brake pipe 16 in the usual manner.

To release an application of the brakes effected by operation of the brake valve device, the brake valve rotary valve is turned to release position in which the brake pipe is recharged with fluid under pressure in the same manner as hereinbefore described.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, of a valve mechanism for effecting successive reductions in the pressure of fluid in said brake pipe, valve means operative when said valve mechanism is effecting the initial reduction in brake pipe pressure for supplying fluid under pressure to said brake pipe to offset leakage from said brake pipe, and means operative, after the initial reduction in brake pipe pressure is effected by said valve mechanism, for rendering said valve means inoperative to supply fluid under pressure to said brake pipe.

2. In a fluid pressure brake, the combination with a brake pipe, of valve mechanism subject to brake pipe pressure and having a charging position for normally supplying fluid under pressure to said brake pipe at a rate corresponding to the rate of leakage of fluid under pressure from said brake pipe, a split reduction valve device for effecting successive reductions in brake pipe pressure to apply the brakes in two stages, means operated during the initial brake pipe reduction to lock said valve mechanism in charging position and operative after the initial brake pipe reduction is completed to unlock said valve mechanism and permit same to be operated by brake pipe pressure to cut off the supply of fluid under pressure to said brake pipe.

3. In a fluid pressure brake, the combination with a brake pipe, of valve mechanism for maintaining the pressure of fluid in said brake pipe against leakage by supplying fluid under pressure to said brake pipe at a rate corresponding to the rate of leakage of fluid under pressure from said brake pipe, a brake pipe discharge valve for venting fluid under pressure from said brake pipe to effect an application of the brakes, means automatically operative, if traffic conditions become unfavorable, for locking said valve mechanism in its maintaining position, and at the same time for causing said brake pipe discharge valve to operate to vent fluid under pressure from said brake pipe, a valve device for limiting the degree of brake pipe reduction initiated by said means and operative upon the completion of said brake pipe reduction to initiate a second reduction and unlock said valve mechanism to permit same to operate and cut off the supply of fluid under pressure to said brake pipe.

4. In a fluid pressure brake, the combination with a brake pipe, of valve mechanism automatically operative to effect successive reductions in brake pipe pressure, valve means controlled by said valve mechanism for supplying fluid under pressure to said brake pipe during the first reduction in brake pipe pressure at a rate corresponding to the rate of leakage of fluid under pressure from said brake pipe, and means operative after the first reduction is completed for rendering said valve means inoperative to supply fluid under pressure to said brake pipe.

5. In a fluid pressure brake, the combination with a brake pipe, of valve mechanism automatically operative to effect successive reductions in brake pipe pressure, and means controlled by said valve mechanism for supplying fluid under pressure to said brake pipe during the first reduction in brake pipe pressure at a rate corresponding to the rate of leakage of fluid under pressure from said brake pipe, and operative after the first reduction is completed to cut off the supply of fluid under pressure to said brake pipe, said means comprising a valve, pressure sensitive means for operating said valve, and fluid pressure operated means for locking said valve in charging position during the first reduction.

6. In a fluid pressure brake, the combination with a brake pipe, of valve mechanism automatically operative to effect successive reductions in brake pipe pressure, and means controlled by said valve mechanism for supplying fluid under pressure to said brake pipe during the first reduction in brake pipe pressure at a rate corresponding to the rate of leakage of fluid under pressure from said brake pipe, and operative after the first reduction is completed to cut off the supply of fluid under pressure to said brake pipe, said means comprising a slide valve, a plurality of flexible diaphragms for operating said slide valve, and a piston operated plunger for engaging said slide valve during the first reduction for locking same in charging position.

7. In a fluid pressure brake, the combination with a main reservoir and a brake pipe, of a feed valve device for reducing the pressure of fluid from said main reservoir to a pressure greater than carried in said brake pipe, a valve device controlled by the pressure of fluid in said brake pipe and the pressure of a spring for supplying fluid under pressure from said feed valve device to said brake pipe and operative by the pressure of fluid in said brake pipe to cut off the supply of fluid under pressure to said brake pipe after the first stage of a two stage reduction in brake pipe pressure is completed.

8. In a fluid pressure brake, the combination with a brake pipe, of a valve device operative normally to supply fluid under pressure to said brake pipe and also operative to cut off the supply of fluid under pressure to said brake pipe after the first stage of a two stage reduction in brake pipe pressure is completed, a main reservoir, and a feed valve device for supplying fluid from said main reservoir to said valve device at a pressure higher than carried in said brake pipe, said valve device being normally controlled by the opposing pressures of fluid at the pressure supplied by said feed valve device in one chamber, and brake pipe pressure and the pressure of a spring in another chamber.

9. In a fluid pressure brake, the combination with a brake pipe, of a valve device for supplying fluid under pressure to said brake pipe during a brake pipe reduction to compensate for leakage of fluid under pressure from said brake pipe, a main reservoir, and a feed valve device for supplying fluid under pressure from said main reservoir to said valve device at a pressure adapted to provide a substantially constant flow through said valve device to the brake pipe throughout the range of said reduction in brake pipe pressure.

10. In a fluid pressure brake, the combination with a brake pipe, of charging means for charging the brake pipe at a rate to compensate for leakage from the brake pipe, means for effecting a reduction in brake pipe pressure, and means operating upon a reduction in brake pipe pressure for locking said charging means in its charging position.

11. In a fluid pressure brake, the combination with a brake pipe, of charging means for charging the brake pipe at a rate to compensate for leakage from the brake pipe, means for effecting a first reduction in brake pipe pressure and then a second reduction in brake pipe pressure, and means operated upon effecting the first reduction in brake pipe pressure for maintaining said charging means in its charging position.

12. In a fluid pressure brake, the combination with a brake pipe, of charging means for charging the brake pipe at a rate to compensate for leakage from the brake pipe, means for effecting a first reduction in brake pipe pressure and then a second reduction in brake pipe pressure, and means operated upon effecting the first reduction in brake pipe pressure for locking said charging means in its charging position, to thereby effect the supply of fluid under pressure to the brake pipe during the first reduction in brake pipe pressure at the charging rate.

13. In a fluid pressure brake, the combination with a brake pipe, of charging means for charging the brake pipe at a rate to compensate for leakage from the brake pipe, means for effecting a first reduction in brake pipe pressure and then a second reduction in brake pipe pressure, means operated upon effecting the first reduction in brake pipe pressure for locking said charging means in its charging position, and means operated upon effecting the second reduction in brake pipe pressure for releasing said charging means.

UNCAS A. WHITAKER.